(12) United States Patent
Berg et al.

(10) Patent No.: US 7,503,215 B2
(45) Date of Patent: *Mar. 17, 2009

(54) HIGHLY SENSITIVE ACCELEROMETER

(75) Inventors: Arne Berg, Kattem (NO); Torbjoern Heglum, Jonsvatnet (NL)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/777,799

(22) Filed: Jul. 13, 2007

(65) Prior Publication Data

US 2008/0011082 A1     Jan. 17, 2008

Related U.S. Application Data

(60) Division of application No. 11/018,944, filed on Dec. 21, 2004, now Pat. No. 7,243,543, which is a continuation-in-part of application No. 10/933,132, filed on Sep. 2, 2004, now Pat. No. 7,013,729, which is a continuation of application No. 10/366,900, filed on Feb. 14, 2003, now Pat. No. 6,789,424, which is a continuation of application No. 09/410,634, filed on Oct. 1, 1999, now Pat. No. 6,575,033.

(51) Int. Cl.
*G01P 15/08* (2006.01)
*G01P 15/00* (2006.01)

(52) U.S. Cl. ............ 73/514.26; 73/514.16; 250/227.14; 250/227.18

(58) Field of Classification Search .............. 73/514.26, 73/659, 514.16, 514.01, 514.38, 514.23, 73/514.36, 655, 657; 356/477; 250/227.14, 250/227.18, 227.19

See application file for complete search history.

(56) References Cited

U.S. PATENT DOCUMENTS

| 3,731,542 | A | 5/1973 | Forsburg |
| 4,322,829 | A | 3/1982 | Davis, Jr. et al. |
| 4,493,212 | A | 1/1985 | Nelson |

(Continued)

FOREIGN PATENT DOCUMENTS

DE      19939583 A1      9/2000

(Continued)

OTHER PUBLICATIONS

British Search Report dated May 30, 2006.

*Primary Examiner*—Helen C. Kwok
(74) *Attorney, Agent, or Firm*—Patterson & Sheridan, L.L.P.

(57) ABSTRACT

Accelerometers for determining acceleration and methods of fabricating an accelerometer are disclosed. In one embodiment, the accelerometer includes a frame, a mass movably suspended on the frame, a fixed element having a rounded surface that does not move with respect to the frame, a movable element having a rounded surface that moves with the mass, and a sensing coil of optical waveguide wrapped around the rounded surfaces to detect movement of the mass in response to acceleration based on interferometric sensing of a change in length of the sensing coil. A method of fabricating the accelerometer includes suspending the mass in the frame and wrapping the optical waveguide around the rounded surfaces. Sensitivity and low fabrication cost of the accelerometers enables their use for integration within an ocean bottom seismic cable. Further, the accelerometer may be an in-line or a cross-line accelerometer depending on the arrangement within the frame.

6 Claims, 14 Drawing Sheets

U.S. PATENT DOCUMENTS

| | | |
|---|---|---|
| 4,567,771 A | 2/1986 | Nelson et al. |
| 4,589,285 A | 5/1986 | Savit |
| 4,719,800 A | 1/1988 | Moser |
| 4,893,930 A | 1/1990 | Garrett et al. |
| 5,001,337 A | 3/1991 | Homuth |
| 5,132,529 A | 7/1992 | Weiss |
| 5,237,632 A | 8/1993 | Henning |
| 5,276,322 A | 1/1994 | Carome |
| 5,369,485 A | 11/1994 | Hofler et al. |
| 5,390,155 A | 2/1995 | Lea |
| 5,437,186 A | 8/1995 | Tschulena |
| 5,497,233 A | 3/1996 | Meyer |
| 5,864,099 A | 1/1999 | Wittrisch et al. |
| 5,883,308 A | 3/1999 | Fersht |
| 5,892,860 A | 4/1999 | Maron et al. |
| 5,903,349 A | 5/1999 | Vohra et al. |
| 5,911,158 A | 6/1999 | Henderson et al. |
| 6,072,567 A | 6/2000 | Sapack |
| 6,161,433 A | 12/2000 | Erath |
| 6,175,108 B1 | 1/2001 | Jones et al. |
| 6,575,033 B1 | 6/2003 | Knudsen et al. |
| 6,789,424 B2 | 9/2004 | Knudsen et al. |
| 6,891,621 B2 | 5/2005 | Berg et al. |
| 7,013,729 B2 | 3/2006 | Knudsen et al. |

FOREIGN PATENT DOCUMENTS

| | | |
|---|---|---|
| EP | 0419173 A1 | 3/1991 |
| JP | 09304169 | 11/1997 |
| WO | 9835208 A1 | 8/1998 |
| WO | 9939214 A1 | 8/1999 |

HIGHLY SENSITIVE ACCELEROMETER

CROSS-REFERENCE TO RELATED APPLICATIONS

This application is a divisional of U.S. patent application Ser. No. 11/018,944 filed Dec. 21, 2004, now U.S. Pat. No. 7,243,543 which is a continuation-in-part of U.S. patent application Ser. No. 10/933,132 filed Sep. 2, 2004, now U.S. Pat. No. 7,013,729, which is a continuation application of Ser. No. 10/366,900, now U.S. Pat. No. 6,789,424 filed Feb. 14, 2003, which is a continuation of application Ser. No. 09/410,634, now U.S. Pat. No. 6,575,033, filed Oct. 1, 1999, all of which are herein incorporated by reference.

BACKGROUND OF THE INVENTION

1. Field of the Invention

Embodiments of the present invention generally relate to highly sensitive accelerometers. More particularly, embodiments of the invention relate to optical accelerometers for applications such as integration into ocean bottom seismic cables.

2. Description of the Related Art

Marine seismic exploration surveys for the exploration and monitoring of hydrocarbon producing zones and reservoirs utilize seismic cables deployed on the ocean floor. The cable includes an array of accelerometers capable of detecting ground acceleration on the ocean floor produced by acoustic vibrations.

One common type of accelerometer includes a mass-spring transducer housed in a sensor case. The sensor case couples to a moving body, the ocean floor, whose motion is inferred from the relative motion between the mass and the sensor case. Such accelerometers relate the relative displacement of the mass with the acceleration of the case, and therefore the ocean floor. Obtaining an ocean bottom seismic (OBS) survey requires placing the seismic cables along the ocean floor, generating seismic waves that travel downward through the earth and reflect off of underground deposits or changes in formation, and recording the reflected seismic waves detected by the accelerometers. Thus, the sensitivity of the accelerometer directly affects the quality of the data acquired by the OBS survey making many prior accelerometers designs unacceptable due to insufficient sensitivity.

Several problems exist with using conventional electrical accelerometers in cable arrays in the ocean. In particular, electrical accelerometers require an insulated electrical conductor for transmitting electrical signals, which can short if the electrical conductor becomes damaged and is exposed to sea water. Further, most high performance piezoelectric accelerometers require power at the sensor head which may be difficult to provide due to the substantial cable length. Also, multiplexing of a large number of such sensors is not only cumbersome but tends to occur at a significant increase in weight and volume of an accelerometer array, as well as a decrease in reliability. Additionally, piezoelectric accelerometers tend to operate poorly at the lowest frequencies in the seismic band.

Many systems and methods for OBS surveying do not retrieve the cable arrays for redeployment and reuse. During a single OBS survey, cable arrays with several thousand accelerometers may be utilized. The large quantity of accelerometers required along with the practice of abandoning the deployed cable arrays after one use makes the cost of the accelerometers very critical. Prior designs of both optical and electrical accelerometers often require a complicated assembly procedure and a large number of specially made parts, thereby increasing the cost to manufacture the accelerometers.

Therefore, there exists a need for an inexpensive optical accelerometer with increased sensitivity for applications such as integration into OBS cable arrays.

SUMMARY OF THE INVENTION

Embodiments of the invention generally relate to accelerometers for determining acceleration and methods of fabricating an accelerometer. In one embodiment, the accelerometer includes a frame, a mass movably suspended on the frame, a fixed element having a rounded surface that does not move with respect to the frame, a movable element having a rounded surface that moves with the mass, and a sensing coil of optical waveguide wrapped around the rounded surfaces to detect movement of the mass in response to acceleration based on interferometric sensing of a change in length of the sensing coil. A method of fabricating the accelerometer includes suspending the mass in the frame and wrapping the optical waveguide around the rounded surfaces. Sensitivity and low fabrication cost of the accelerometers enables their use for integration within an ocean bottom seismic cable. Further, the accelerometer may be an in-line or a cross-line accelerometer depending on the arrangement within the frame.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally relate to an optical accelerometer. The accelerometer may be coupled to any surface or structure subjected to acceleration to be sensed. In one particular application, the highly sensitive accelerometers described herein may be disposed within sensor stations spaced along a seismic cable used to obtain an ocean bottom seismic (OBS) survey. As described in greater detail herein for some embodiments, each accelerometer may include a pair of fiber optic sensors separated by a length of optical fiber, forming an interferometer. Each sensor in the pair may reflect a narrow wavelength band of light having a central wavelength. Each accelerometer may operate at a different wavelength band and central wavelength such that the signals may be easily detected using Wavelength Division Multiplexing (WDM) techniques. Alternatively, the signals may be separated in time using Time Division Multiplexing (TDM).

Figure 1:
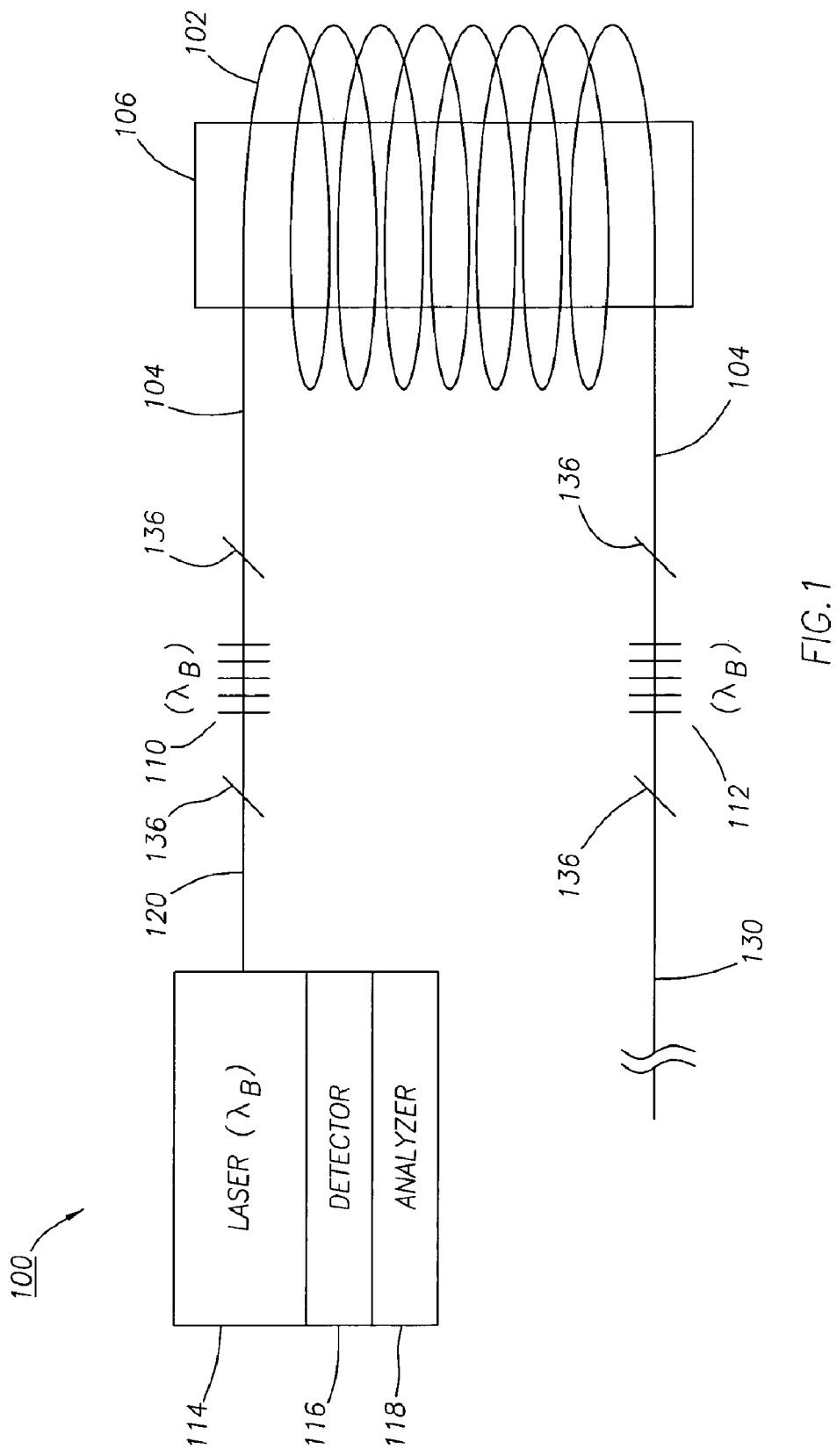
FIG. 1 is a schematic that depicts a Bragg grating interferometric sensing system as an exemplary sensing system in which embodiments of the invention may be utilized.

FIG. 1 schematically illustrates a simplified optical waveguide interferometric accelerometer system 100. The accelerometer system 100 includes a sensing coil 102 comprised of a number of tightly wrapped turns of an optical waveguide 104 (such as an optical fiber) around a sensing assembly 106. Embodiments of the present invention include configurations where the sensing coil 102 may be disposed on or within an elastic member. The sensing assembly 106 should be understood as generically representing any of the inventive sensing assemblies subsequently described herein. The sensing coil 102 is bounded by a pair of Bragg gratings 110, 112 that have the same Bragg wavelength ($\lambda B$). In some applications, it may not be practical to form the sensing coil 102 and the Bragg gratings 110, 112 along a continuous section of optical waveguide. In that case, the individual components, such as input and output optical waveguides 120, 130, the sensing coil 102, and the Bragg gratings 110, 112 can be individually formed and then spliced together. FIG. 1 illustrates such splices using slash marks 136.

The sensing coil 102 acts as a sensor since the length (L) of the sensing coil 102 depends on the diameter of the sensing assembly 106, which, in turn, depends on the acceleration experienced by the sensing assembly 106. Well known interferometric interrogation techniques, such as Fabry-Perot, Michelson, or Mach-Zehnder, can determine the length of the sensing coil 102. For example, a series of optical pulses from a pulse generator 114 can be applied to the sensing coil 102 through the input optical waveguide 120. Reflections of optical pulses from the Bragg gratings 110, 112, which are partially transmissive, are detected by a detector 116 and analyzed by an analyzer 118. By assessing the phase shift in the pulses that are reflected from the two Bragg gratings 110, 112, the length of the sensing coil 102 can be determined.

Acceleration causes a change in length $\Delta L$ of the length L and a corresponding change in the round trip path of pulses reflected from the second Bragg grating 112, which causes the phase relationship between the light pulses detected at the detector 116 to vary. The analyzer 118 senses the phase variance and provides an electrical output that corresponds to the acceleration. The output optical waveguide 130 can be connected to other optical components or sensors deployed along with the accelerometer system 100. Other strain sensing techniques including the use of piezoelectric, electronic or electric strain gauges may be used to measure the variations in strain on the sensing coil 102 such as those described and shown in FIGS. 15-23 of U.S. Pat. No. 6,575,033, entitled "Highly Sensitive Accelerometer," which is herein incorporated by reference in its entirety.

The sensing assembly 106 may include a mass-spring arranged within the sensing coil 102 to provide either an in-line accelerometer or a cross-line accelerometer. Movement of the mass in response to acceleration results in the change in length of the sensing coil 102.

Figure 2:
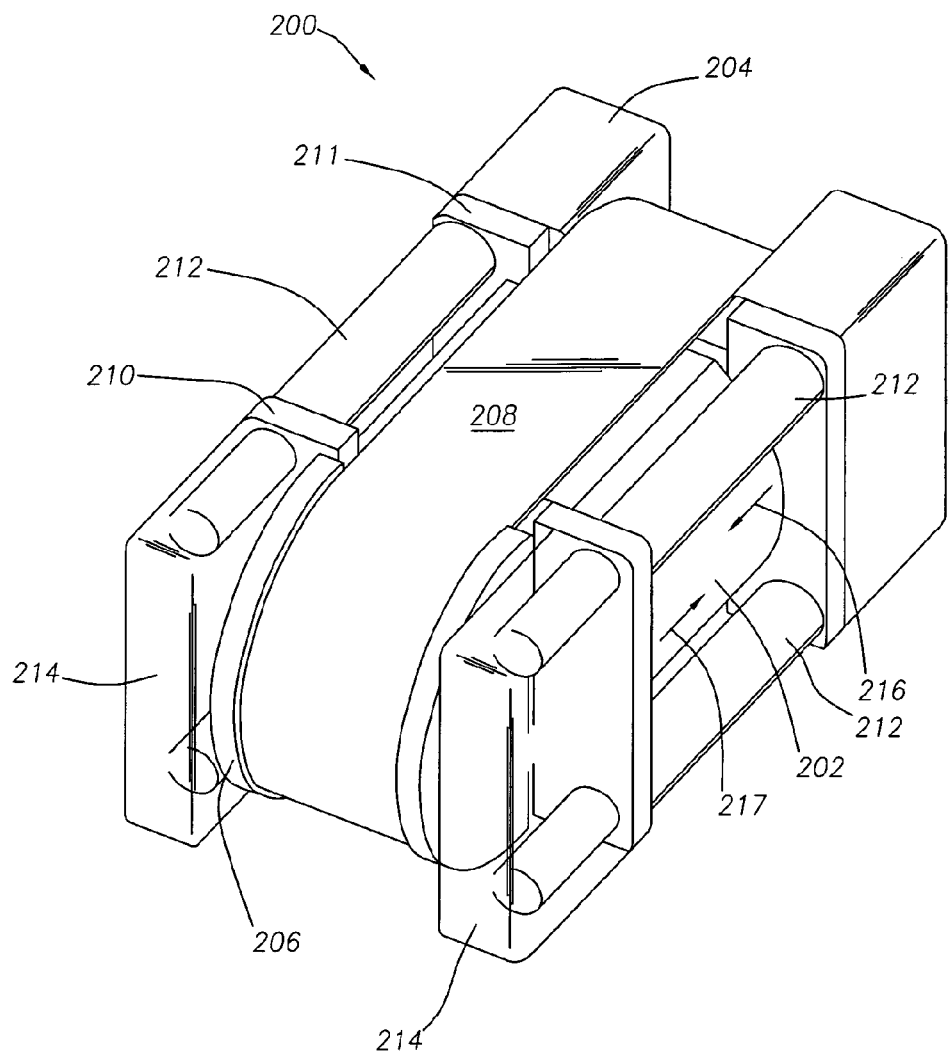
FIG. 2 is a perspective view of an assembled in-line accelerometer.

FIG. 2 illustrates an assembled in-line accelerometer 200 that includes a counter mass 202, a stationary half cylinder 204, a movable half cylinder 206 movably coupled with the counter mass 202, a sensing coil 208 wrapped around the half cylinders 204, 206, and a frame formed by first and second frame plates 210, 211 held together by four bolts 212.

Figure 3:
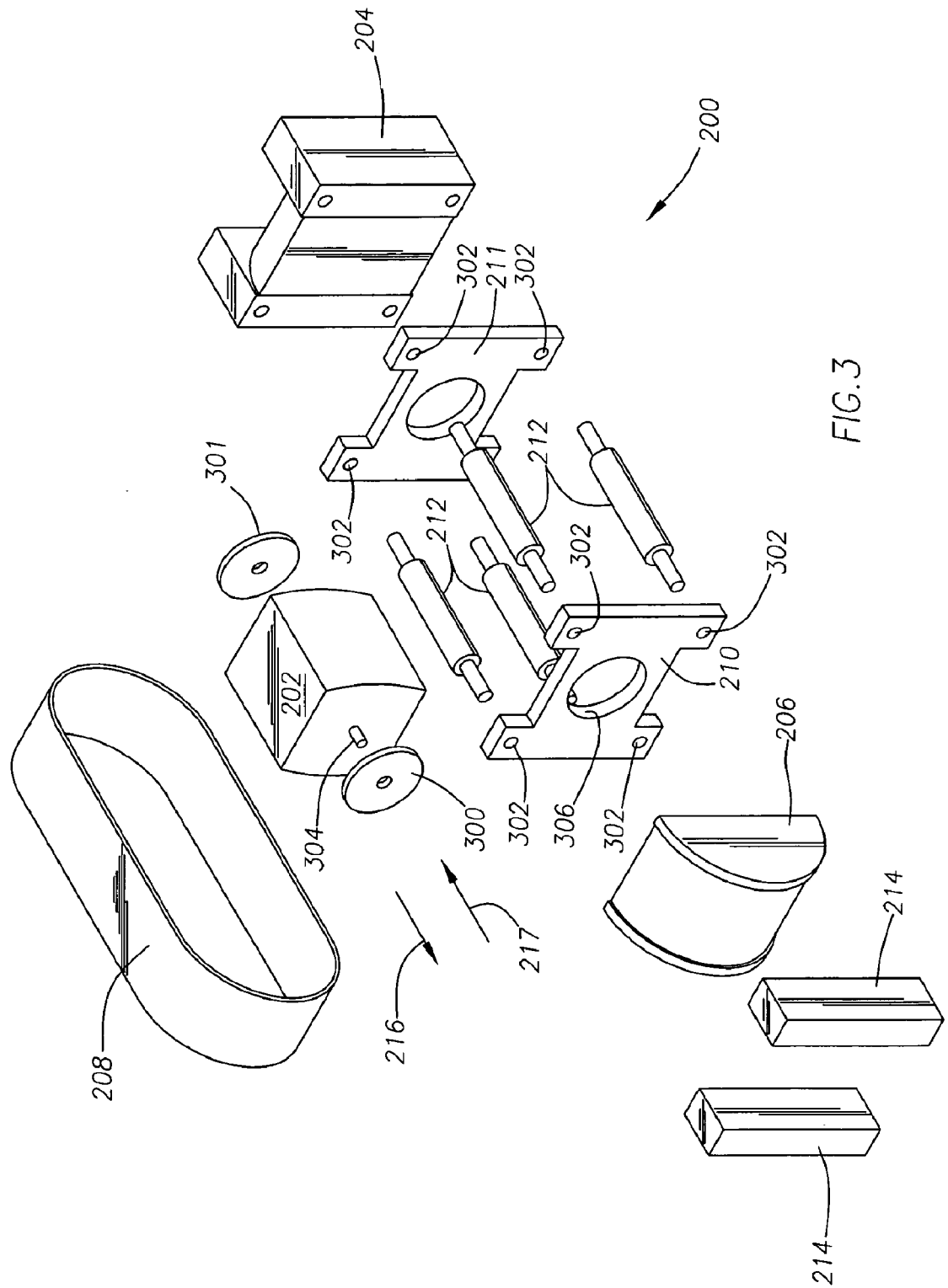
FIG. 3 is an exploded view of the in-line accelerometer shown in FIG. 2.

FIG. 3 shows the in-line accelerometer 200 in an exploded view with first and second diaphragms 300, 301 positioned to support the counter mass 202 between the frame plates 210, 211. The sensing coil 208 preferably includes windings of optical fibers that form an elastic member responsive to movements of the movable half cylinder 206 with respect to the stationary half cylinder 204 by elongating or relaxing resulting in detectable changes in length. Thus, the half cylinders 204, 206 and the counter mass 202 provide the sensing assembly such that the sensing coil 208 lengthens or shortens to produce a signal corresponding to the acceleration.

For example, the counter mass 202 displaces within the frame plates 210, 211 in the direction indicated by arrow 216 when the in-line accelerometer 200 accelerates in the opposite direction indicated by arrow 217. In this particular case, the tension in the sensing coil 208 increases as the movable half cylinder 206 moves away from the stationary half cylinder 204 such that the fiber length of the sensing coil 208 increases. Similarly, the counter mass 202 displaces within the frame plates 210, 211 in the direction indicated by arrow 217 when the in-line accelerometer 200 accelerates in the opposite direction indicated by arrow 216 such that the movable half cylinder 206 moves toward the stationary half cylinder 204 and the fiber length of the sensing coil 208 decreases. As previously described, this change in length results in a detectable change in phase angle between the signals reflected from the sensors (e.g., Bragg gratings) separated by the sensing coil 208.

Figure 4:
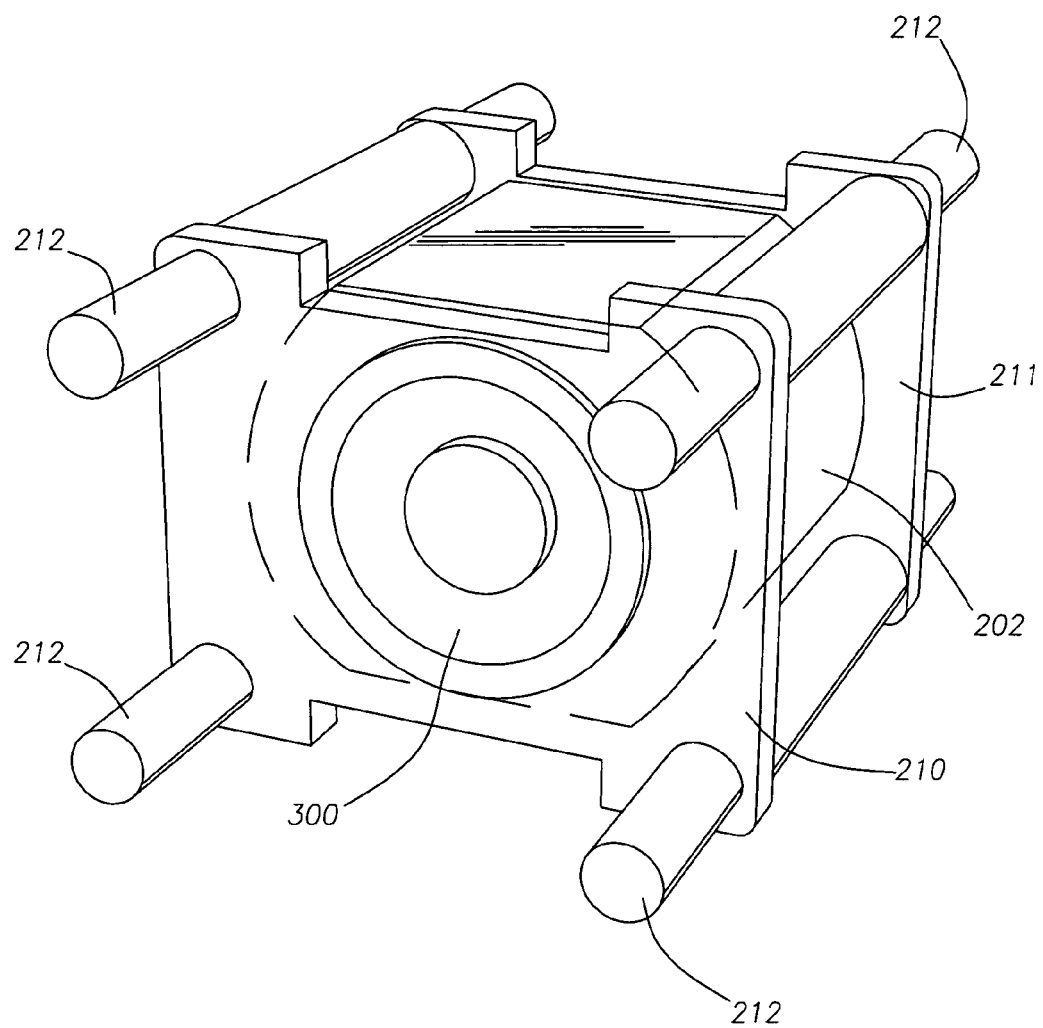
FIG. 4 is a perspective view of the in-line accelerometer shown in FIG. 2 as it would appear during assembly thereof with a counter mass supported within a frame by two diaphragms.

FIG. 4 illustrates the in-line accelerometer 200 as it would appear during assembly thereof with the counter mass 202 supported between the frame plates 210 (shown transparent), 211 by the diaphragms 300, 301 (not visible). With reference to FIG. 3, ends of the bolts 212 with reduced diameters extend through apertures 302 at the corners of the frame plates 210, 211 until a shoulder formed by the reduced diameter abuts the frame plates 210, 211. The first and second diaphragms 300, 301 secure to the center of the first and second frame plates 210, 211, respectively, such as by welding. Each of the diaphragms 300, 301 couple to opposite ends of the counter mass 202. A short member such as post 304 may extend from the ends of the counter mass 202 to facilitate attachment thereof with the diaphragms 300, 301. Diaphragms 300, 301 flex in the direction of arrows 216, 217 to permit movement of the counter mass 202 in the axis along these directions. However, the diaphragms 300, 301 substantially prevent movement of the counter mass 202 along other axes since the diaphragms 300, 301 are stiff in these axes.

Figure 5:
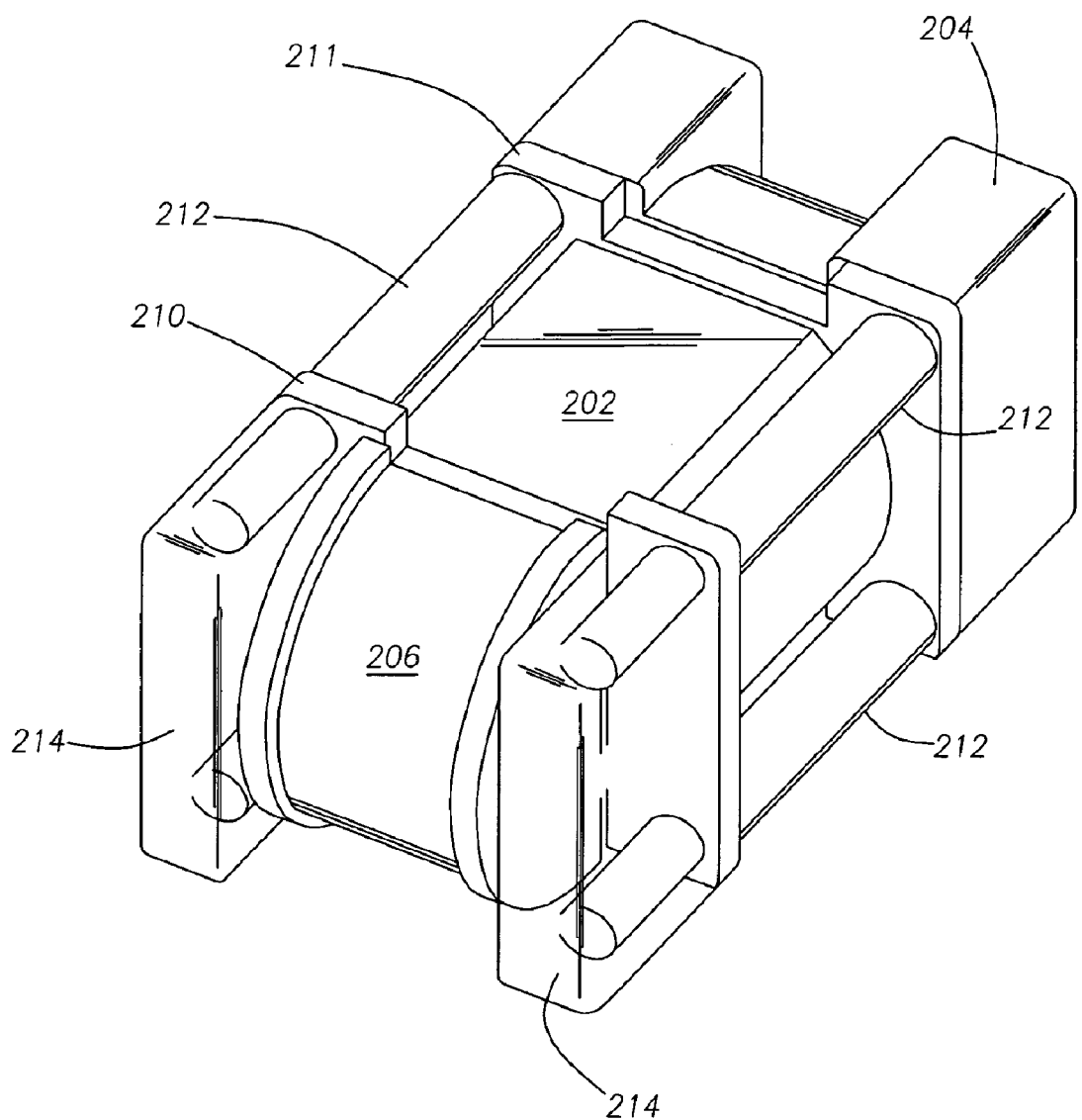
FIG. 5 is a perspective view of the in-line accelerometer shown in FIG. 2 as it would appear during assembly thereof after the addition of a stationary half cylinder to the frame and a movable half cylinder to the mass.

FIG. 5 shows the in-line accelerometer 200 as it would appear during assembly thereof after the addition of the stationary half cylinder 204 and the movable half cylinder 206. In particular, the stationary half cylinder 204 secures to the bolts 212 extending from the second frame plate 211 on the side of the second frame plate 211 opposite from the counter mass 202. Since the movable half cylinder 206 is positioned adjacent a face of the first frame plate 210 opposite from the counter mass 202, a center aperture 306 (shown in FIG. 3) through the first frame plate 210 enables coupling of the movable half cylinder 206 with the counter mass 202 using any type of conventional connector. The accelerometer may additionally include blocks 214 (shown transparent) secured to the bolts 212 extending from the first frame plate 210 on the side of the first frame plate 210 opposite from the counter mass 202. The blocks 214 provide further support to the bolts 212 and protect and guide the movement of the movable half cylinder 206. Once assembled, the movable half cylinder 206 freely moves between the fixed blocks 214 with the movement of the counter mass 202, which moves with respect to the frame plates 210, 211, the stationary half cylinder 204 and the blocks 214 that are all locked together by the bolts 212. The sensing coil 208 increases the effective spring constant of the mechanical resonator made by the counter mass 202 and the sensing coil 208, thereby improving the frequency response of the in-line accelerometer 200.

As is apparent from FIG. 5, winding of the sensing coil 208 around the half cylinders 204, 206 to complete the in-line accelerometer 200 can be accomplished easily and performed directly thereon after all other assembly of the in-line accelerometer 200 is complete. Thus, there is no need for a separate manufacturing process to form the sensing coil 208 which may facilitate assembly and reduce cost. During winding of the sensing coil 208, the diaphragms 300, 301 may be used as springs to pre-strain the sensing coil 208 such that the sensing coil 208 is responsive to movement of the movable half cylinder 206 in both directions indicated by arrows 216, 217. In addition, the design of the in-line accelerometer 200 utilizes a relatively small number of parts in order to further simplify the manufacturing process. Furthermore, parts required for the design of the in-line accelerometer 200 such as the half cylinders 204, 206, the counter mass 202, and/or the blocks 214 may be made using polymers along with efficient molding techniques to further reduce manufacturing costs.

Figure 6:
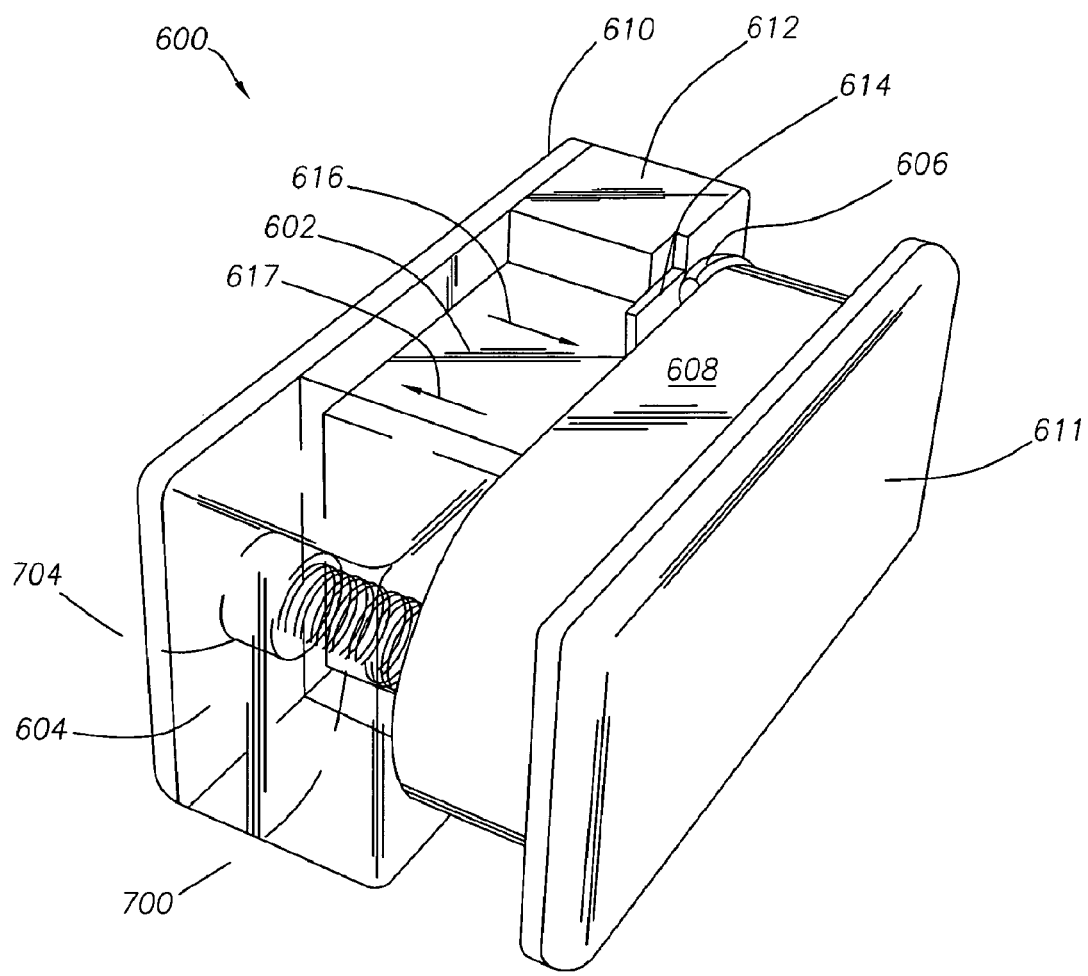
FIG. 6 is a perspective view of an assembled cross-line accelerometer.

FIG. 6 illustrates an assembled cross-line accelerometer 600 that includes a hinged counter mass 602, a stationary half cylinder 604 (shown transparent), a movable half cylinder 606 movably coupled with the hinged counter mass 602, a sensing coil 608 disposed around the half cylinders 604, 606, and a frame formed by a first frame plate 610.

Figure 7:
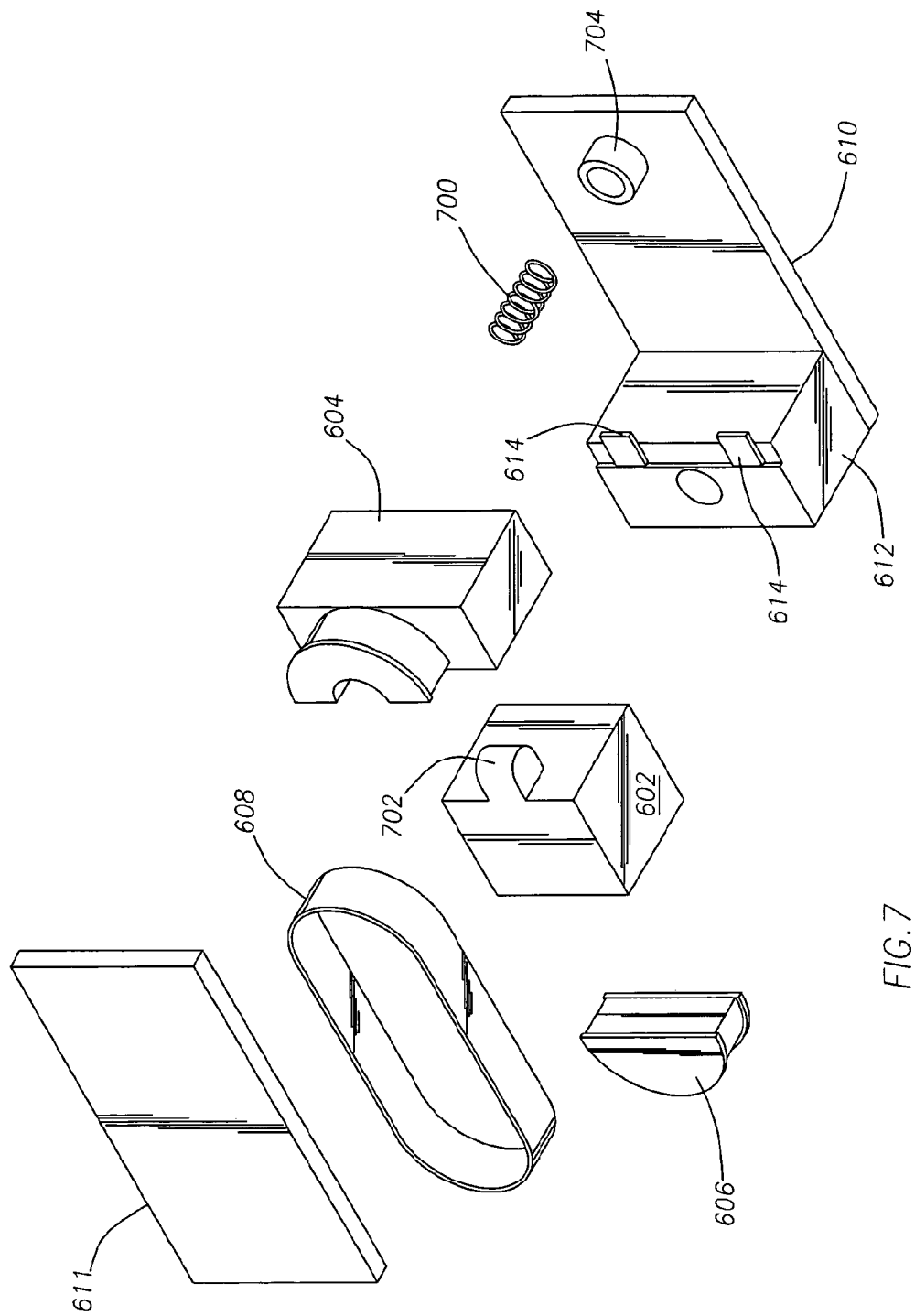
FIG. 7 is an exploded view of the cross-line accelerometer shown in FIG. 6.

FIG. 7 shows the cross-line accelerometer 600 in an exploded view. Similar to the in-line accelerometer 200 shown in FIGS. 2-5, the sensing coil 608 preferably includes windings of optical fibers that form an elastic member responsive to movements of the movable half cylinder 606 with respect to the stationary half cylinder 604 by elongating or relaxing. Again, the half cylinders 604, 606 and the hinged counter mass 602 provide the sensing assembly. However, the cross-line accelerometer 600 detects cross-line acceleration instead of in-line acceleration as detected by the in-line accelerometer 200 previously discussed. Thus, the action of the sensing coil 608 lengthens or shortens the optical fibers and produces a signal corresponding to the acceleration as the counter mass 602 displaces in the direction indicated by arrows 616, 617 depending on the direction of acceleration along the axis identified by the arrows 616, 617.

Figure 8:
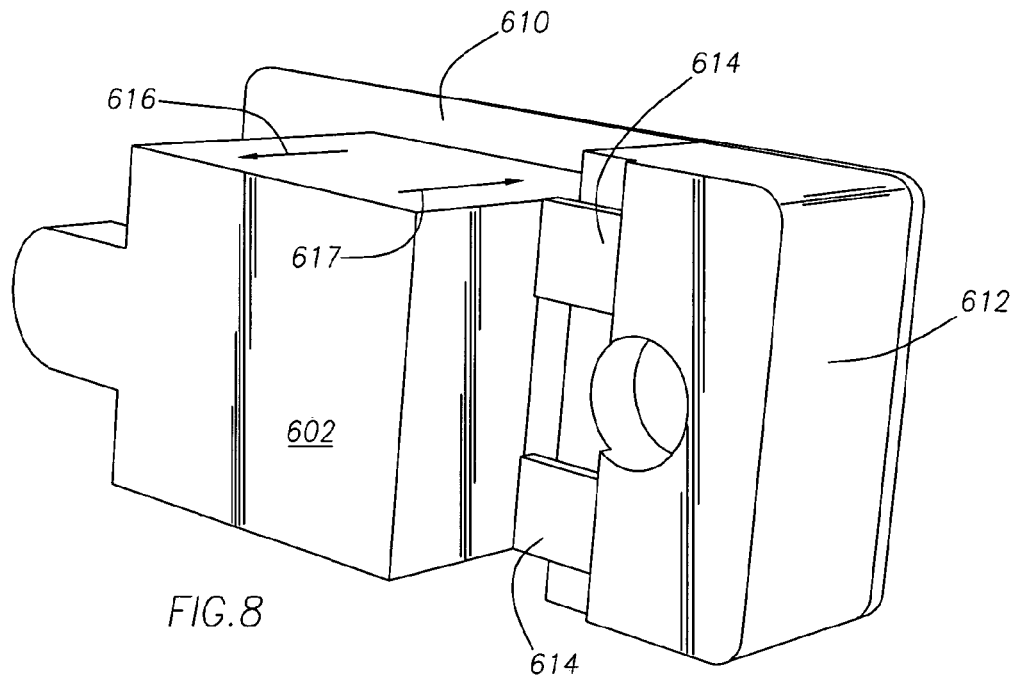
FIG. 8 is a perspective view of the cross-line accelerometer shown in FIG. 6 as it would appear during assembly thereof with a counter mass hinged to a frame.

FIG. 8 shows the cross-line accelerometer 600 as it would appear during assembly thereof with the counter mass 602 hinged to the first frame plate 610. In particular, the first frame plate 610 includes a mounting clamp 612 secured at one end thereto. Two blades 614 located in-line with one another and made of a material such as steel extend from the top of the first frame plate 610 in a direction facing the opposite end of the first frame plate 610 from where the mounting clamp 612 is located. The blades 614 connect to approximately the center of the hinged counter mass 602 to permit pivotal movement of the hinged counter mass 602 with respect to the first frame plate 610. Thus, the blades 614 flex in one plane identified by arrows 616, 617 while the blades 614 substantially prevent movement of the counter mass 602 along other axes since the blades are stiff in these axes. Furthermore, the blades 614 represent a spring pulling the hinged counter mass 602 back to its center position during operation.

Figure 9:
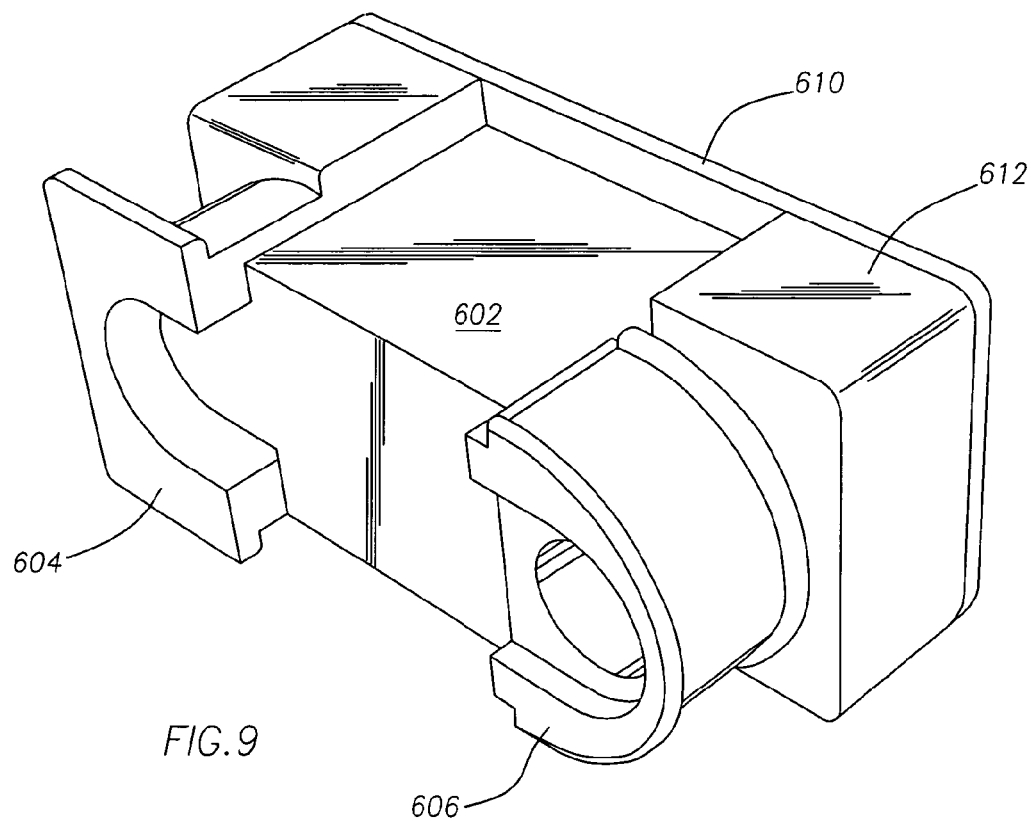
FIG. 9 is a perspective view of the cross-line accelerometer shown in FIG. 6 as it would appear during assembly thereof after the addition of a stationary half cylinder to the frame and a movable half cylinder to the mass.

FIG. 9 shows the cross-line accelerometer 600 as it would appear during assembly thereof after the addition of the stationary half cylinder 604 and the movable half cylinder 606. Specifically, the stationary half cylinder 604 rigidly secures by any conventional connection to the end of the first mounting plate 610 opposite from the mounting clamp 612. The movable half cylinder 606 mounts directly to the hinged counter mass 602 using any conventional connection. For some embodiments, the location of the movable half cylinder 606 and the stationary half cylinder 604 may be transposed such that the stationary half cylinder 604 is adjacent the hinge point of the mass 602. Appropriate tolerances remain between parts (e.g., the movable half cylinder 606 and the mounting clamp 612) of the cross-line accelerometer 600 after assembly thereof to not inhibit the required travel of the hinged counter mass 602 with respect to the frame plate 610 and the stationary half cylinder 604. Thus, pivoting of the hinged counter mass 602 caused by acceleration of the cross-line accelerometer 600 in the direction of arrows 616, 617 effectively increases or decreases the separation between the half cylinders 604, 606 upon the rotational movement of the movable half cylinder 606 coupled to the mass 602.

Referring back to FIGS. 6 and 7, a second frame plate 611 may be secured to the top of the stationary half cylinder 604. Additionally, the cross-line accelerometer 600 may further include a biasing member such as a spring 700 located on the opposite side of the hinged counter mass 602 from the blades 614. The spring 700 rests within a spring retainer 704 on the first frame plate 610 and acts against the first frame plate 610 and an extension 702 extending from the hinged counter mass 602. In this position, the spring 700 biases the end of the hinged counter mass 602 against the force in the direction indicated by the arrow 617 generated by pre-tension of the sensing coil 608 that tends to pull the hinged counter mass 602 out of its center aligned position. The spring 700 increases the effective spring constant of the mechanical resonator made by the hinged counter mass 602 and the sensing coil 608, thereby improving the frequency response of the cross-line accelerometer 600.

The cross-line accelerometer 600 shares many of the benefits of the in-line accelerometer 200. For example, winding of the sensing coil 608 around the half cylinders 604, 606 to complete the cross-line accelerometer 600 can be accomplished easily and performed directly thereon after all other assembly of the cross-line accelerometer 600 is complete. In addition, the design of the cross-line accelerometer 600 utilizes a relatively small number of parts that may be made using polymers along with efficient molding techniques to further simplify the manufacturing process and further reduce manufacturing costs.

Figure 10:
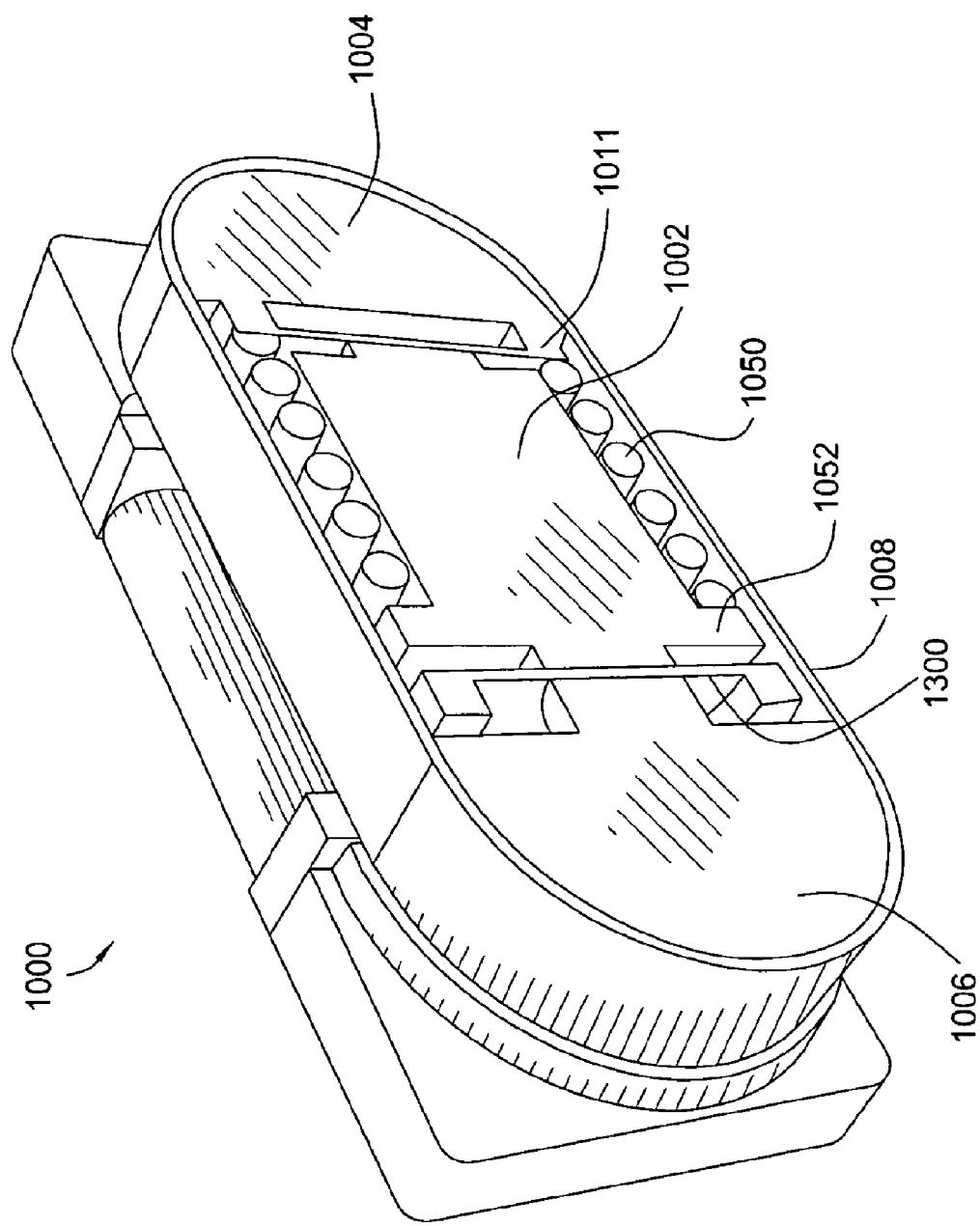
FIG. 10 is a sectional view of an in-line accelerometer having a spring to bias a counter mass and hence a movable half cylinder.

FIG. 10 illustrates a cross section view of an in-line accelerometer 1000 substantially similar to the in-line accelerometer 200 shown in FIGS. 2-5 and explained above. However, the in-line accelerometer 1000 illustrated in FIG. 10 includes a spring 1050 disposed about the outside of a counter mass 1002 to bias the counter mass 1002 and hence a movable half cylinder 1006. One end of the spring 1050 is supported by a frame plate 1011 of the in-line accelerometer 1000 such that the other end of the spring 1050 that is in contact with a shoulder 1052 of the counter mass 1002 acts to push the counter mass 1002 away from a stationary half cylinder 1004. Thus, the bias of the counter mass 1002 and the movable half cylinder 1006 away from the stationary half cylinder 1004 by the spring 1050 can be used to aid in applying a pre-strain to a sensing coil 1008 disposed around the half cylinders 1004, 1006. The spring 1050 can be relatively soft with a long stroke to obtain the required force to pre-strain the sensing coil 1008. The long stroke and softness of the spring 1050 increases the efficiency and scale factor compared to use of a short and stiff spring, such as a diaphragm used to pre-strain the sensing coil 1008. Since the spring 1050 is used to pre-strain the sensing coil 1008, a diaphragm 1300 that only has to effectively guide movement of the counter mass 1002 can be made softer.

Figure 11:
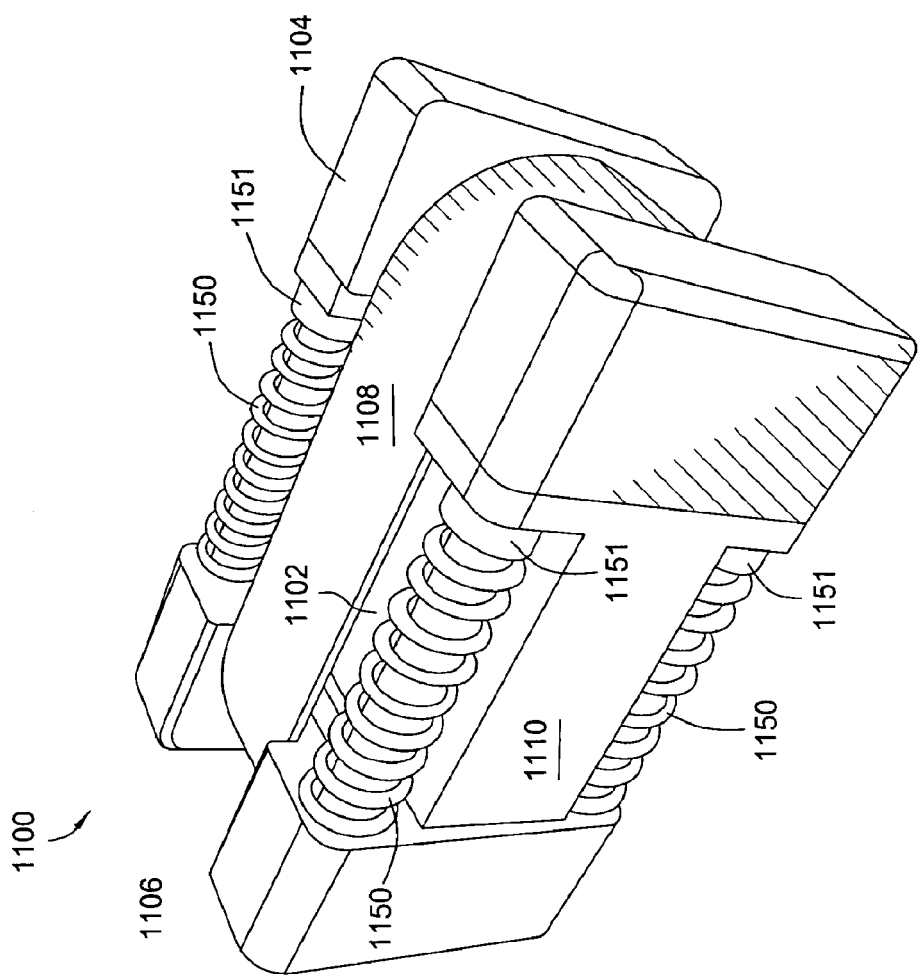
FIG. 11 is a perspective view of an in-line accelerometer having four springs to bias a movable half cylinder directly.

FIG. 11 shows an in-line accelerometer 1100 that includes four springs 1150 (only three are visible) to directly bias a movable half cylinder 1106 away from a stationary half cylinder 1104. In this embodiment, the four springs 1150 located away from an area where a counter mass 1102 is disposed enable pre-straining of a sensing coil 1108 in a manner similar to the spring 1050 shown in FIG. 10 and described above. The counter mass 1102 mounts within a central housing 1110 by use of diaphragms (not visible). As with other embodiments described herein, the stationary half cylinder 1104 rigidly couples to the central housing 1110 while the movable half cylinder 1106 moves with the counter mass 1102. Four pins 1151 (only three are visible) couple to a perimeter of the central housing 1110 and extend toward an inside face of the movable half cylinder 1106 without coming into contact with the movable half cylinder 1106. The pins 1151 serve as supports for the springs 1150 that are concentrically disposed about the pins 1151 in order to prevent buckling of the springs 1150. One end of each of the springs 1150 is supported relative to the central housing 1110 such that the other end of each of the springs 1150 that is in contact with the movable half cylinder 1106 acts to push the movable half cylinder 1106 away from the stationary half cylinder 1104. Thus, the bias of the movable half cylinder 1106 away from the stationary half cylinder 1104 by the springs 1150 can be used to aid in applying a pre-strain to the sensing coil 1108 disposed around the half cylinders 1104, 1106.

Figure 12:
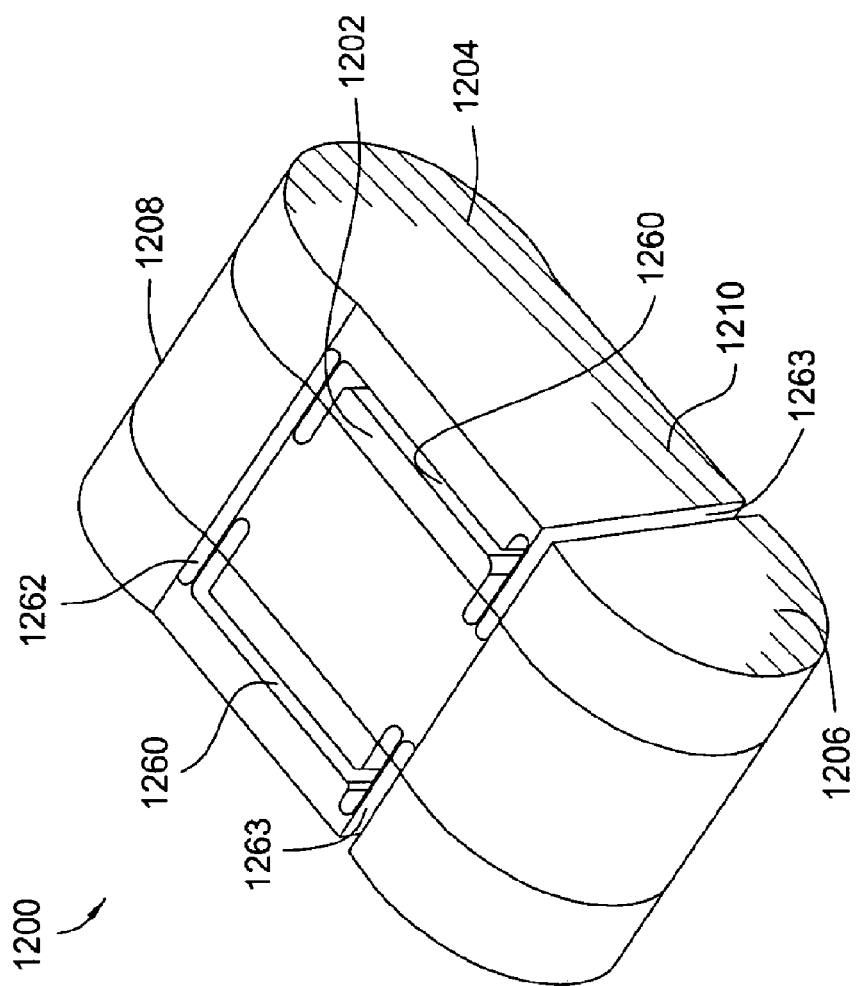
FIG. 12 is a perspective view of an in-line accelerometer with integral components.

FIG. 12 illustrates an in-line accelerometer 1200 with integral components. The in-line accelerometer 1200 includes a counter mass 1202, a stationary half cylinder 1204, a movable half cylinder 1206 and a central frame 1210 that are all formed from a single piece of steel by wire cutting or laser cutting to make the required splitting of the components. The cutting is through the whole body of the in-line accelerometer 1200. Internal cuts 1260 define the counter mass 1202 within the central frame 1210 and form one side of a diaphragm region. An outer cut 1262 defines the stationary half cylinder 1204 that is rigid with respect to the central frame 1210. Slots 1263 define the movable half cylinder 1206 that moves with the counter mass 1202. The half cylinders 1204, 1206 can be formed by milling. Alternatively, the half cylinders 1204, 1206 can be separate components added to the body such as partial tubular components or components made separately in a lath. A sensing coil 1208 is shown invisible around the half cylinders 1204, 1206.

Figure 13:
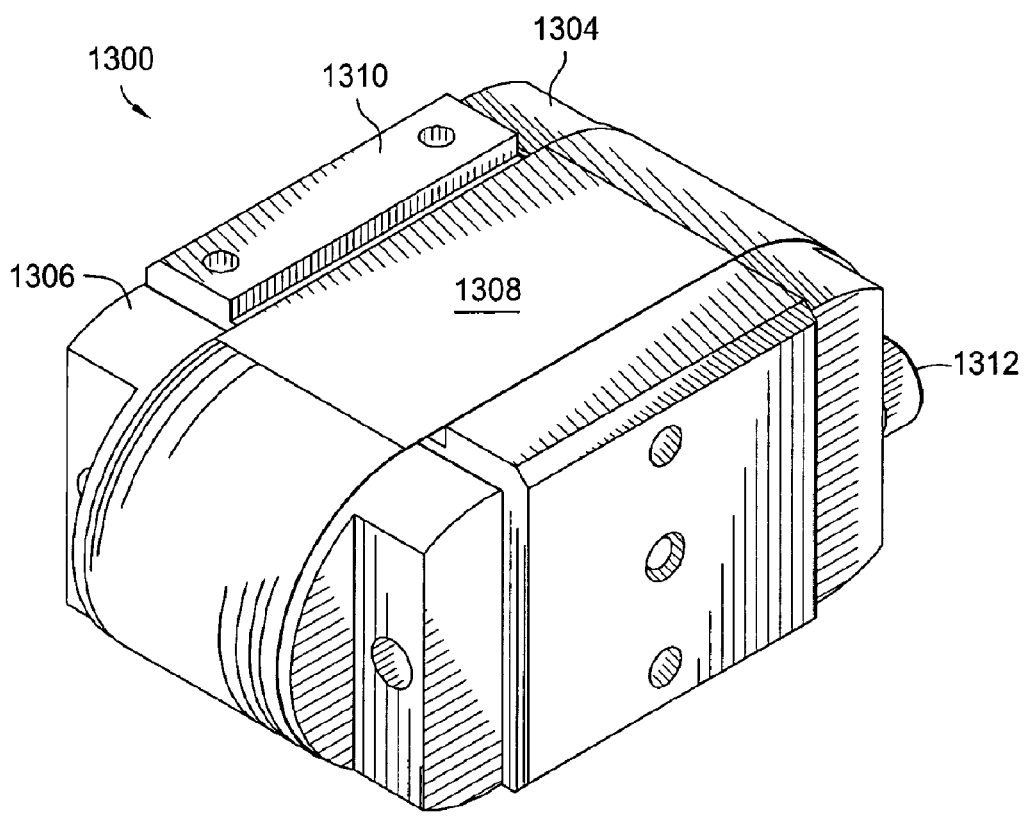
FIG. 13 is a perspective view of an in-line accelerometer according to another embodiment.

FIG. 13 shows an in-line accelerometer 1300 according to another embodiment. Similar to the other embodiments described herein, the in-line accelerometer 1300 includes a counter mass 1302 (visible in FIGS. 14 and 15), a stationary half cylinder 1304, a movable half cylinder 1306, a central frame 1310 and a sensing coil 1308 around the half cylinders 1304, 1306. In addition to the in-line accelerometer utilizing a relatively small number of parts, the two half cylinders 1304, 1306 may be substantially identical to further reduce manufacturing costs. Two bolts 1312 secure the stationary half cylinder 1304 to the central frame 1310.

Figure 14:
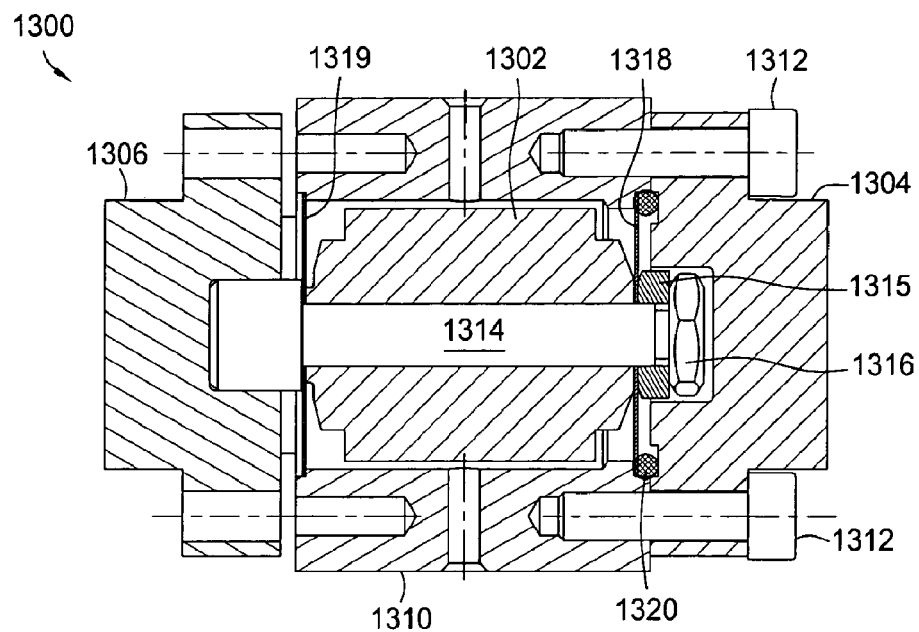
FIG. 14 is a partial sectional view of the in-line accelerometer of FIG. 13 taken across a top of the in-line accelerometer.
Figure 15:
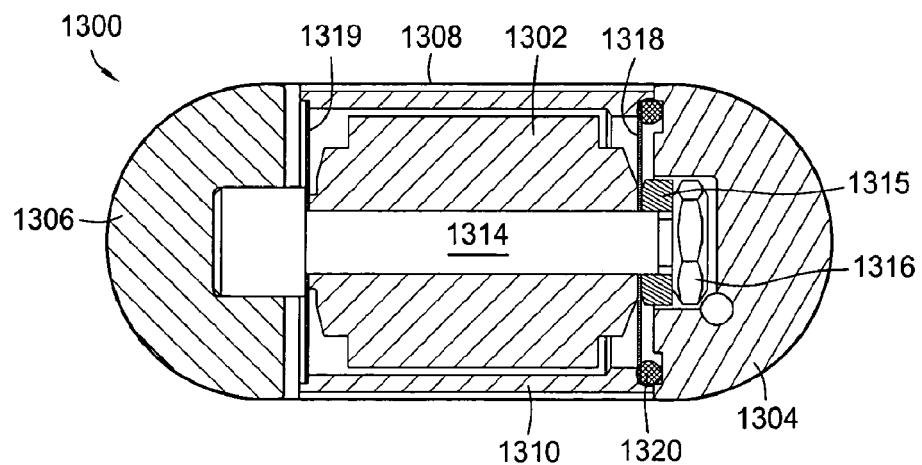
FIG. 15 is a partial sectional view of the in-line accelerometer of FIG. 13 taken across a side of the in-line accelerometer.

FIGS. 14 and 15 illustrate partial sectional views of the in-line accelerometer 1300. An assembly bolt 1314 extends through a longitudinal central bore of the counter mass 1302 and a first diaphragm 1319 where an end of the assembly bolt 1314 couples to a face of the movable half cylinder 1306 facing the counter mass 1302. On the other side of the counter mass 1302 from the movable half cylinder 1306, a nut 1316 attaches to the assembly bolt 1314 to engage a diaphragm clamp 1315 on an opposite side of a second diaphragm 1318 from the counter mass 1302. Accordingly, this arrangement of the assembly bolt 1314 sandwiches the counter mass 1302 between the two diaphragms 1318, 1319 such that the movable half cylinder 1306 moves with the counter mass 1302 suspended by the diaphragms 1318, 1319. Additionally, an o-ring 1320 may be disposed between the central housing 1310 and the stationary half cylinder 1304.

Figure 16:
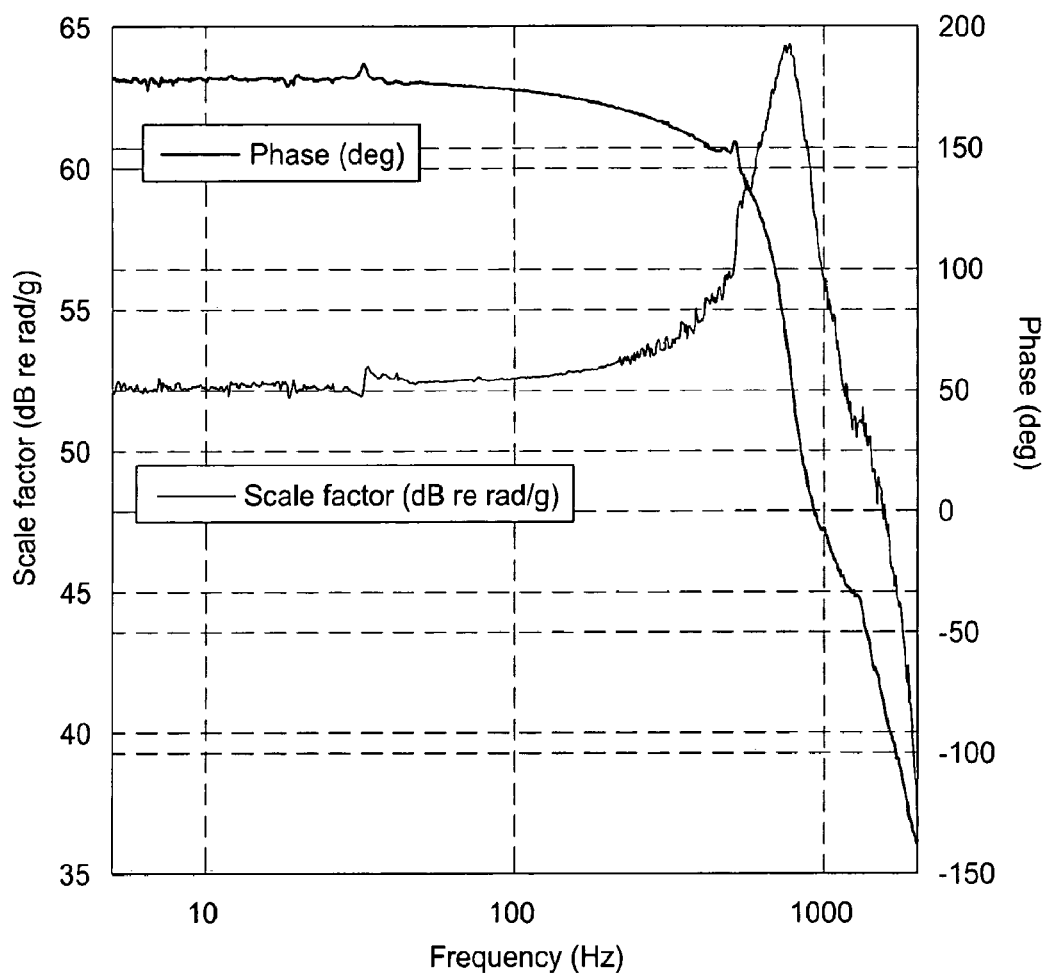
FIG. 16 is a graph of the measured performance of a tested sample of the accelerometer illustrated in FIG. 13.

FIG. 16 is a graph showing measured performance of a tested design of the accelerometer 1300 by plotting a relative response of the accelerometer to an excitation force on a test shaker. The results shown in the graph are obtained by monitoring the accelerometer across a range of frequencies when the accelerometer is installed in an oil-filled housing to reduce mechanical resonance. As evidenced by the graph, the specific accelerometer provides a response with a flat curve within a desired range of operation and a peak corresponding to the mechanical resonance that is damped by the oil. The damping can be made even more efficient by using oil with a higher viscosity. Additionally, the frequency of the mechanical resonance can be changed based on the mass and spring constant selected for the accelerometer.

For any geometry of the wraps described herein, more than one layer of fiber may be used depending on the overall fiber length and sensitivity desired. It is further within the scope of the present invention that the sensing coil may comprise the optical fiber disposed in a helical pattern (not shown) about the half cylinders. Other geometries for the wraps may be used if desired. The desired axial length of any particular wrap is set depending on the characteristics of the acceleration sensitivity and other parameters desired to be measured, for example, the magnitude of the acceleration. Furthermore, the half cylinders generally provide rounded surfaces for wrapping the sensing coil thereon to prevent straining and sharp bending of the sensing coil. However, the surface supporting the sensing coil may be any other shape than rounded such as flat, angled or undulated. In addition, various elements of the accelerometers 200, 600 may be integrated into a single element for some embodiments. For example, the stationary half cylinder 204 may be integral with the second frame plate 211.

While the foregoing is directed to embodiments of the present invention, other and further embodiments of the invention may be devised without departing from the basic scope thereof, and the scope thereof is determined by the claims that follow.

The invention claimed is:

1. A cross-line accelerometer, comprising:
   a rigid frame;
   a mass hinged to the rigid frame and movable in response to an acceleration in a linear direction;
   a fixed element rigidly coupled to the rigid frame, the fixed element disposed on a first side of the mass and defining a first surface;
   a movable element coupled to the mass for movement therewith, the movable element defining a second surface and disposed on a second side of the mass opposite the first side of the mass, wherein the fixed element and the movable element are linearly spaced from one another in a direction perpendicular to the linear direction; and
   a sensing coil at least partly wrapped around the first and second surfaces, wherein a change in length of the sensing coil is indicative of the acceleration.

2. The cross-line accelerometer of claim 1, wherein one or more blades couple the second side of the mass to the rigid frame, the one or more blades flexible in the linear direction and substantially inflexible in other directions.

3. The cross-line accelerometer of claim 1, further comprising a biasing member disposed in contact with a portion of the mass opposite a hinge point of the mass with respect to the rigid frame.

4. The cross-line accelerometer of claim 3, wherein the biasing member is a spring.

5. The cross-line accelerometer of claim 1, wherein the sensing coil comprises multiple wraps of an optical waveguide.

6. The cross-line accelerometer of claim 1, wherein the rigid frame includes two parallel frame plates with the mass, the fixed element and the movable element located between the two parallel frame plates.

* * * * *